(12) United States Patent
Mahafzah

(10) Patent No.: US 10,049,084 B2
(45) Date of Patent: Aug. 14, 2018

(54) RULES BASED CONTENT MANAGEMENT SYSTEM AND METHOD

(71) Applicant: HealthSTAR Communications, Mahwah, NJ (US)

(72) Inventor: Ala Mahafzah, Wayne, NJ (US)

(73) Assignee: HSC Acquisition, LLC, Mahwah, NJ (US)

( * ) Notice: Subject to any disclaimer, the term of this patent is extended or adjusted under 35 U.S.C. 154(b) by 380 days.

(21) Appl. No.: 13/846,009

(22) Filed: Mar. 18, 2013

(65) Prior Publication Data

US 2014/0281848 A1 Sep. 18, 2014

(51) Int. Cl.
*G06F 17/00* (2006.01)
*G06F 17/21* (2006.01)
*G06F 17/30* (2006.01)

(52) U.S. Cl.
CPC ...... *G06F 17/211* (2013.01); *G06F 17/30056* (2013.01)

(58) Field of Classification Search
CPC ............ G06F 17/211; G06F 17/30896; G06F 17/30056
USPC ................................. 715/200, 255
See application file for complete search history.

(56) References Cited

U.S. PATENT DOCUMENTS

| | | | | |
|---|---|---|---|---|
| 5,509,112 A * | 4/1996 | Doi | .......... | G06T 17/00 345/440 |
| 5,781,190 A * | 7/1998 | Gorbet et al. | ........... | 715/748 |
| 7,493,561 B2 * | 2/2009 | Sareen | .......... | G06F 17/30056 715/200 |
| 7,703,003 B2 * | 4/2010 | Payne | .......... | G06F 17/243 715/234 |
| 7,743,323 B1 * | 6/2010 | Rodriguez | .......... | G06F 17/24 715/200 |
| 7,814,404 B2 * | 10/2010 | Shenfield | .......... | G06F 8/70 715/200 |
| 7,836,110 B1 | 11/2010 | Schoenbach et al. | | |
| 7,996,767 B2 * | 8/2011 | Lee | .......... | G06F 17/2247 715/255 |
| 8,214,518 B1 * | 7/2012 | Bertz | .......... | H04L 65/605 709/219 |

(Continued)

FOREIGN PATENT DOCUMENTS

JP H08249385 A 9/1996
JP 2000149045 A 5/2000

(Continued)

OTHER PUBLICATIONS

Franklin et al., Plan-based Interfaces: Keeping Track of User Tasks and Acting to Cooperate, ACM 2002, pp. 79-86.*

(Continued)

*Primary Examiner* — Cong-Lac Huynh
(74) *Attorney, Agent, or Firm* — Taft Stettinius & Hollister LLP

(57) ABSTRACT

In a method for generating a presentation, a computer communicates data representative of a plurality of presentation components. A computer receives data representative of a presentation component selected from the plurality of presentation components. A computer retrieves a predefined rule associated with the selected presentation component. A computer applies the rule associated with the selected presentation component. A computer inserts the presentation component in a presentation.

18 Claims, 5 Drawing Sheets

(56) References Cited

U.S. PATENT DOCUMENTS

| | | | | |
|---|---|---|---|---|
| 8,341,528 | B2* | 12/2012 | Chaudhary | G06F 17/3002 715/730 |
| 8,856,659 | B2* | 10/2014 | Mindrum | G06F 17/211 715/204 |
| 9,058,396 | B2* | 6/2015 | Kim | G06F 17/30873 |
| 9,436,685 | B2* | 9/2016 | Roth | G06F 17/3002 |
| 9,715,485 | B2* | 7/2017 | Roth | G06F 17/218 |
| 2002/0103737 | A1* | 8/2002 | Briere | 705/36 |
| 2002/0178093 | A1* | 11/2002 | Dean | G06Q 10/087 705/28 |
| 2003/0066028 | A1* | 4/2003 | Payne | G06F 17/243 715/255 |
| 2004/0015783 | A1* | 1/2004 | Lennon | G06F 17/30389 715/235 |
| 2004/0259068 | A1* | 12/2004 | Philipp et al. | 434/350 |
| 2005/0119990 | A1* | 6/2005 | Lee et al. | 707/1 |
| 2005/0138198 | A1* | 6/2005 | May | 709/233 |
| 2006/0037052 | A1* | 2/2006 | McDowell et al. | 725/80 |
| 2006/0085369 | A1* | 4/2006 | Bauer et al. | 706/45 |
| 2006/0253213 | A1* | 11/2006 | Ocke et al. | 700/97 |
| 2007/0130177 | A1* | 6/2007 | Schneider et al. | 707/100 |
| 2009/0198542 | A1* | 8/2009 | D'Amore | G06Q 30/02 705/14.15 |
| 2010/0083358 | A1* | 4/2010 | Govindarajan et al. | 726/6 |
| 2010/0088605 | A1* | 4/2010 | Livshin et al. | 715/731 |
| 2010/0122220 | A1* | 5/2010 | Ainsworth | G06F 17/30899 715/866 |
| 2010/0136509 | A1* | 6/2010 | Mejer | G06F 19/363 434/219 |
| 2010/0178902 | A1* | 7/2010 | Boctor | 455/414.3 |
| 2010/0191554 | A1* | 7/2010 | Singh | G06Q 10/063 705/7.11 |
| 2011/0178854 | A1* | 7/2011 | Sofer et al. | 705/14.4 |
| 2011/0252031 | A1* | 10/2011 | Blumenthal et al. | 707/733 |
| 2011/0314053 | A1* | 12/2011 | Morikawa | G09B 7/04 707/769 |
| 2012/0095817 | A1* | 4/2012 | Kamil et al. | 705/14.4 |
| 2012/0110196 | A1* | 5/2012 | Balasaygun | H04L 12/1818 709/228 |
| 2012/0110443 | A1* | 5/2012 | Lemonik | G06F 17/241 715/255 |
| 2012/0136804 | A1* | 5/2012 | Lucia et al. | 705/36 R |
| 2012/0192086 | A1* | 7/2012 | Ghods | G06Q 10/10 715/753 |
| 2012/0215737 | A1* | 8/2012 | Jennings | 707/602 |
| 2012/0243848 | A1* | 9/2012 | Martin | H04N 21/47202 386/241 |
| 2012/0246105 | A1* | 9/2012 | James | G06F 19/327 706/47 |
| 2012/0284605 | A1* | 11/2012 | Sitrick | G06F 17/00 715/230 |
| 2013/0073449 | A1* | 3/2013 | Voynow | G06Q 30/0601 705/39 |
| 2013/0144714 | A1* | 6/2013 | Yuan | H04L 65/4069 705/14.47 |
| 2014/0095254 | A1* | 4/2014 | Chauhan et al. | 705/7.29 |
| 2014/0122595 | A1* | 5/2014 | Murdoch | C03C 21/002 709/204 |
| 2014/0207870 | A1* | 7/2014 | Vaya | 709/205 |
| 2014/0250056 | A1* | 9/2014 | Kuspa | 707/603 |
| 2014/0380171 | A1* | 12/2014 | Maloney | G06F 3/04847 715/732 |
| 2015/0010894 | A1* | 1/2015 | Morisset | G09B 7/00 434/362 |
| 2015/0143243 | A1* | 5/2015 | Balfe | G06F 17/2241 715/732 |
| 2015/0170303 | A1* | 6/2015 | Geritz | G06Q 10/00 705/326 |
| 2015/0177964 | A1* | 6/2015 | Spirer | G06F 17/30056 715/732 |
| 2015/0332397 | A1* | 11/2015 | Clarke | G06Q 40/04 705/37 |
| 2016/0012027 | A9* | 1/2016 | Rebstock | G06Q 10/00 715/255 |
| 2016/0253741 | A1* | 9/2016 | Otto | G06N 3/12 |
| 2017/0000450 | A1* | 1/2017 | Ferro, Jr. | A61B 6/4429 |

FOREIGN PATENT DOCUMENTS

| | | |
|---|---|---|
| JP | 2006126881 A | 5/2006 |
| WO | 2010/076562 A1 | 7/2010 |

OTHER PUBLICATIONS

Bergman et al., Outline Wizard: Presentation Composition and Search, ACM 2010, pp. 209-218.*

International Search Report issued for PCT/US2014/022356 dated Sep. 16, 2014.

Written Opinion issued for PCT/US2014/022356 dated Sep. 16, 2014.

Japanese Notice of Grounds of Rejection; Japanese Patent Office; Japanese Patent Application No. 2016-504303; Mar. 6, 2018; 6 pages.

* cited by examiner

RULES BASED CONTENT MANAGEMENT SYSTEM AND METHOD

FIELD OF INVENTION

The present disclosure relates to the field of managing content of a presentation. More particularly, the present invention relates to a rules based content management system and method for managing content of a presentation.

BACKGROUND

Digital presentations are used to educate and inform audiences on particular subjects as well as to market products and services. Furthermore, presentations are used in a variety of industries and in a variety of different applications. For example, a drug company representative may use a presentation to educate a medical professional about the benefits of a particular drug. Tools such as Microsoft PowerPoint, for example, enable a user to create such presentation.

In certain industries, a user may be required to adhere to specific rules and regulations in terms of the type of content that can be included in such presentations and the format in which the content is presented. However, a user creating a presentation may not be familiar with the industry specific rules which a presentation must adhere to or may inadvertently overlook the rules when creating a presentation.

SUMMARY OF THE INVENTION

In a method for generating a presentation, a computer communicates data representative of a plurality of presentation components. A computer receives data representative of a presentation component selected from the plurality of presentation components. A computer retrieves a predefined rule associated with the selected presentation component. A computer applies the rule associated with the selected presentation component. A computer inserts the presentation component in a presentation.

A system for generating a presentation comprises at least one processor, at least one computer-readable tangible storage device, and program instructions stored on the at least one storage device for execution by the at least one processor. The program instructions comprise first program instructions configured to communicate data representative of a plurality of presentation components. The program instructions further comprise second program instructions configured to receive data representative of a presentation component selected from the plurality of presentation components. The program instructions further comprise third program instructions configured to retrieve a predefined rule associated with the selected presentation component. The program instructions further comprise fourth program instructions configured to apply the rule associated with the selected presentation component. The program instructions further comprise fifth program instructions configured to insert the presentation component in a presentation.

A computer program product for generating a presentation comprises at least one computer-readable tangible storage device and program instructions stored on the at least one storage device. The program instructions comprise first program instructions configured to communicate data representative of a plurality of presentation components. The program instructions further comprise second program instructions configured to receive data representative of a presentation component selected from the plurality of presentation components. The program instructions further comprise third program instructions configured to retrieve a predefined rule associated with the selected presentation component. The program instructions further comprise fourth program instructions configured to apply the rule associated with the selected presentation component. The program instructions further comprise fifth program instructions configured to insert the presentation component in a presentation.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
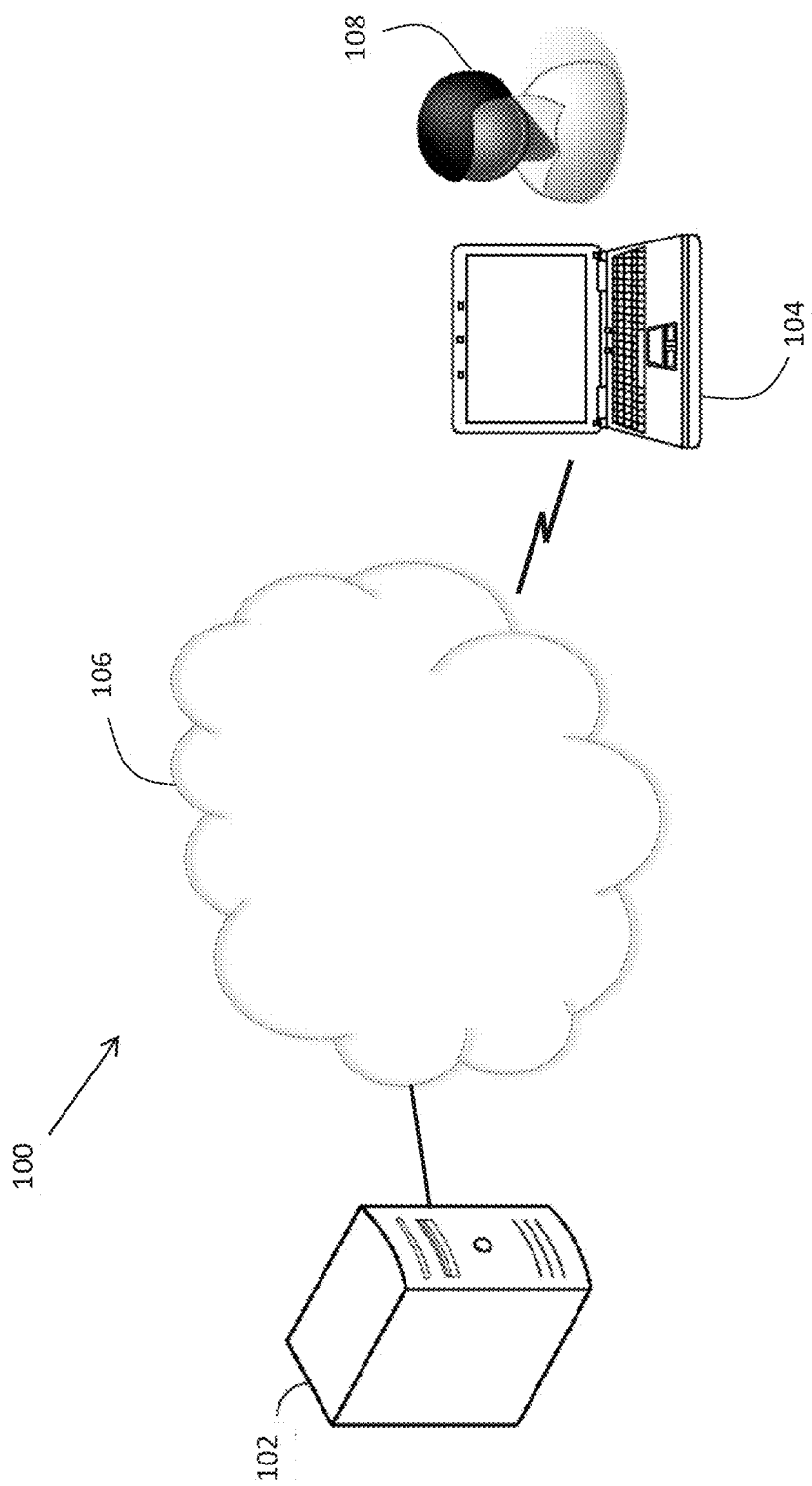
FIG. 1 illustrates an example rules based content management system for managing content of a presentation.

The following includes definitions of selected terms employed herein. The definitions include various examples, forms, or both of components that fall within the scope of a term and that may be used for implementation. The examples are not intended to be limiting. Both singular and plural forms of terms may be within the definitions.

"Computer communication," as used herein, refers to a communication between two or more computing devices (e.g., computer, personal digital assistant, cellular telephone) and can be, for example, a network transfer, a file transfer, an applet transfer, an email, a hypertext transfer protocol (HTTP) transfer, and so on. A computer communication can occur across, for example, a wireless system (e.g., IEEE 802.11, IEEE 802.15), an Ethernet system (e.g., IEEE 802.3), a token ring system (e.g., IEEE 802.5), a local area network (LAN), a wide area network (WAN), a point-to-point system, a circuit switching system, a packet switching system, combinations thereof, and so on.

"Computer-readable medium," as used herein, refers to a medium that participates in directly or indirectly providing signals, instructions, or data. A computer-readable medium may take forms, including, but not limited to, non-volatile media, volatile media, and transmission media. Non-volatile media may include, for example, optical or magnetic disks, and so on. Volatile media may include, for example, optical or magnetic disks, dynamic memory, and the like. Transmission media may include coaxial cables, copper wire, fiber optic cables, and the like. Transmission media can also take the form of electromagnetic radiation, like that generated during radio-wave and infra-red data communications, or take the form of one or more groups of signals. Common forms of a computer-readable medium include, but are not limited to, a floppy disk, a flexible disk, a hard disk, a magnetic tape, other magnetic media, a CD-ROM, other optical media, punch cards, paper tape, other physical media with patterns of holes, a RAM, a ROM, an EPROM, a FLASH-EPROM, or other memory chip or card, a memory stick, a carrier wave/pulse, Phase Change Memory, and other media from which a computer, a processor, or other electronic device can read. Signals used to propagate instructions or other software over a network, like the Internet, can be considered a "computer-readable medium."

"Data store," as used herein, refers to a physical or logical entity that can store data. A data store may be, for example, a database, a table, a file, a list, a queue, a heap, a memory, a register, and so on. A data store may reside in one logical or physical entity or may be distributed between two or more logical or physical entities.

"Logic," as used herein, includes but is not limited to hardware, firmware, software, or combinations of each to perform a function(s) or an action(s), or to cause a function or action from another logic, method, or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

"Software," as used herein, includes but is not limited to, one or more computer or processor instructions that can be read, interpreted, compiled, or executed and that cause a computer, processor, or other electronic device to perform functions, actions, or behave in a desired manner. The instructions may be embodied in various forms like routines, algorithms, modules, methods, threads, or programs including separate applications or code from dynamically or statically linked libraries. Software may also be implemented in a variety of executable or loadable forms including, but not limited to, a stand-alone program, a function call (local or remote), a servelet, an applet, instructions stored in a memory, part of an operating system, or other types of executable instructions. It will be appreciated by one of ordinary skill in the art that the form of software may depend, for example, on requirements of a desired application, the environment in which it runs, or the desires of a designer/programmer or the like. It will also be appreciated that computer-readable or executable instructions can be located in one logic or distributed between two or more communicating, co-operating, or parallel processing logics and thus can be loaded or executed in serial, parallel, massively parallel, and other manners.

Suitable software for implementing the various components of the example systems and methods described herein may be produced using programming languages and tools like Java, Java Script, Java.NET, ASP.NET, VB.NET, Cocoa, Pascal, C#, C++, C, CGI, Perl, SQL, APIs, SDKs, assembly, firmware, microcode, or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User," as used herein, includes but is not limited to one or more persons, software, computers or other devices, or combinations of these.

FIG. 1 illustrates an example system 100 for managing content of a presentation. System 100 includes a content management server 102 configured to manage content being added to a presentation by enforcing rules associated with the content. Content management server 102 communicates with a computer 104 via Internet 106. Computer 104 provides a user 108 with an interface (not shown) for adding content to a presentation. By managing content being added to a presentation, content management server 102 enables user 108 to create presentations that adhere to industry specific rules and standards, even when user 108 may not be familiar with the rules or when user 108 may not remember to enforce the rules.

A presentation, in one example, is a slideshow, such as a Microsoft PowerPoint slideshow. In such an example, content includes pages or slides to be added to the slideshow. In another example, a presentation may include other forms of digital media such as a video presentation, an audio presentation, a document, or other suitable forms of presenting information. In such examples, content may include video clips, audio clips, document pages, and so on.

Rules associated with presentation content may include various legal standards, compliance standards, or other types of standards, restrictions, or guidelines, either general or specific to an industry. Rules may dictate what information may be presented, in what order information may be presented, to whom information may be presented, and so on. For example, pharmaceutical industry regulations may require a pharmaceutical representative to present Important Safety Information relating to a drug before presenting promotional material relating to the drug. Accordingly, a slide that promotes the benefits of a drug may have an associated rule which prevents the slide from being added to a presentation unless the presentation already includes a preceding slide that conveys the Important Safety Information.

Although the example system and method described herein makes reference to managing presentation content for the pharmaceutical industry, it should be understood that the example system and method may similarly be used to manage presentation content for various industries and in various applications in which the content of presentations may be subject to industry rules and regulations.

It should be understood that, although content management server 102 is depicted as being in wired communication to Internet 106, content management server 102 may also be in wireless communication with Internet 106. Similarly, although computer 104 is depicted as being in wireless communication to Internet 106, computer 104 may also be in wired communication to Internet 106.

Although not illustrated, it should be further understood that the functionality of the backend content management server 102 and the functionality of the front end computer 104 may be combined into a single computer. In such an example, a single computer may provide both back-end rules based content management as well as a front end user interface.

Figure 2:
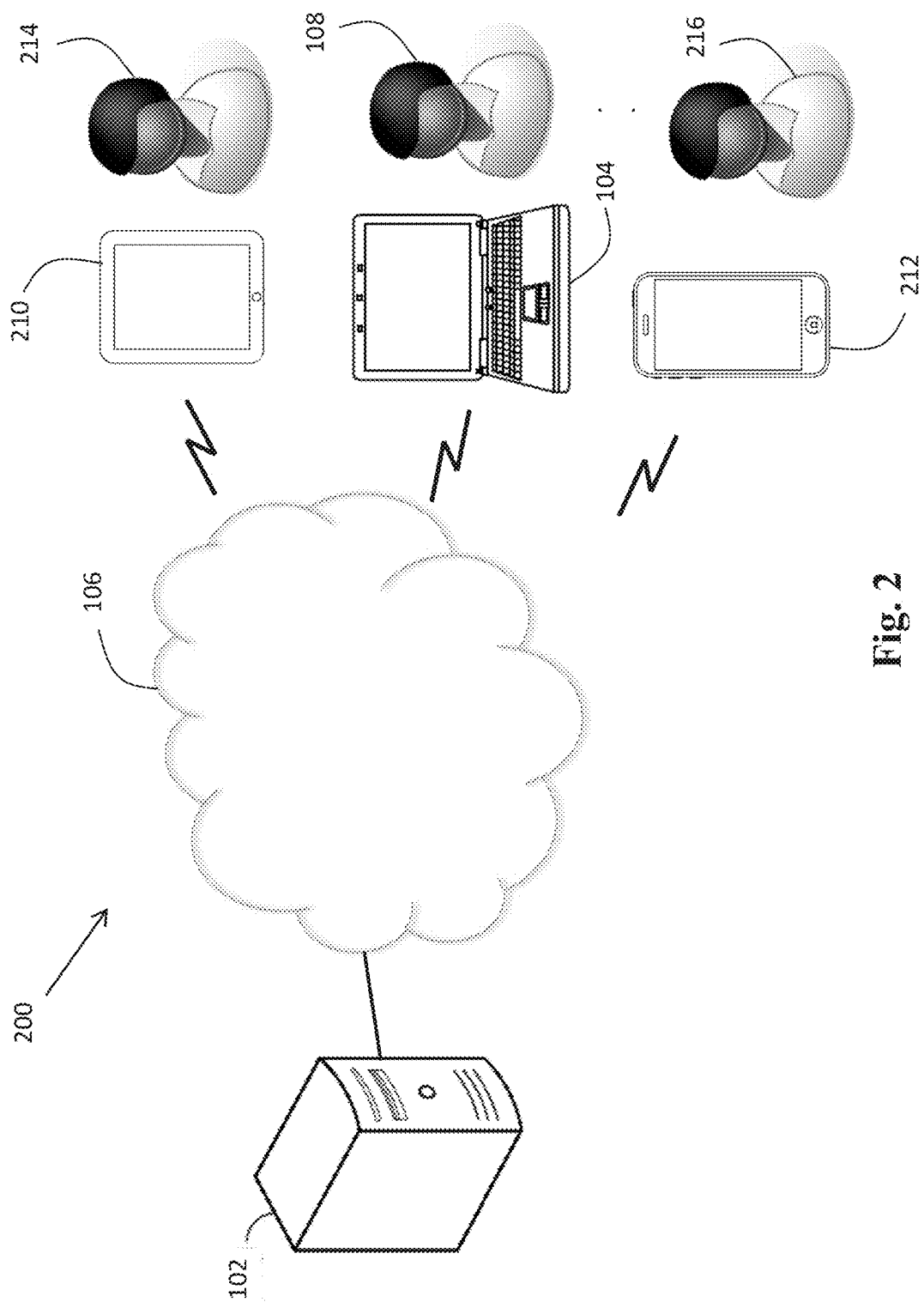
FIG. 2 illustrates an example rules based content management system for managing content of a presentation.

It should be further understood that, although system 100 depicts a single user 108 interacting with a single computer 104, system 100 may comprise multiple users interacting with multiple devices to create multiple presentations. In addition, although computer 104 is depicted as a laptop personal computer, it should be understood that computer 104 may also include any type of similar computing device capable of communicating with content management server 102 and providing user 108 an interface for adding content to a presentation. For example, computer 104 may include a mobile phone such as a smartphone, a tablet computer, a desktop computer, and so on. FIG. 2 illustrates another example system 200 for managing content of a presentation including multiple users and multiple computing devices. In addition to content management server 102 communicating with computer 104 which provides user 108 with an interface for adding content to a presentation, content management server 102 also communicates with tablet computer 210 and mobile phone 212 which provide interfaces to users 214 and 216, respectively.

Figure 3:
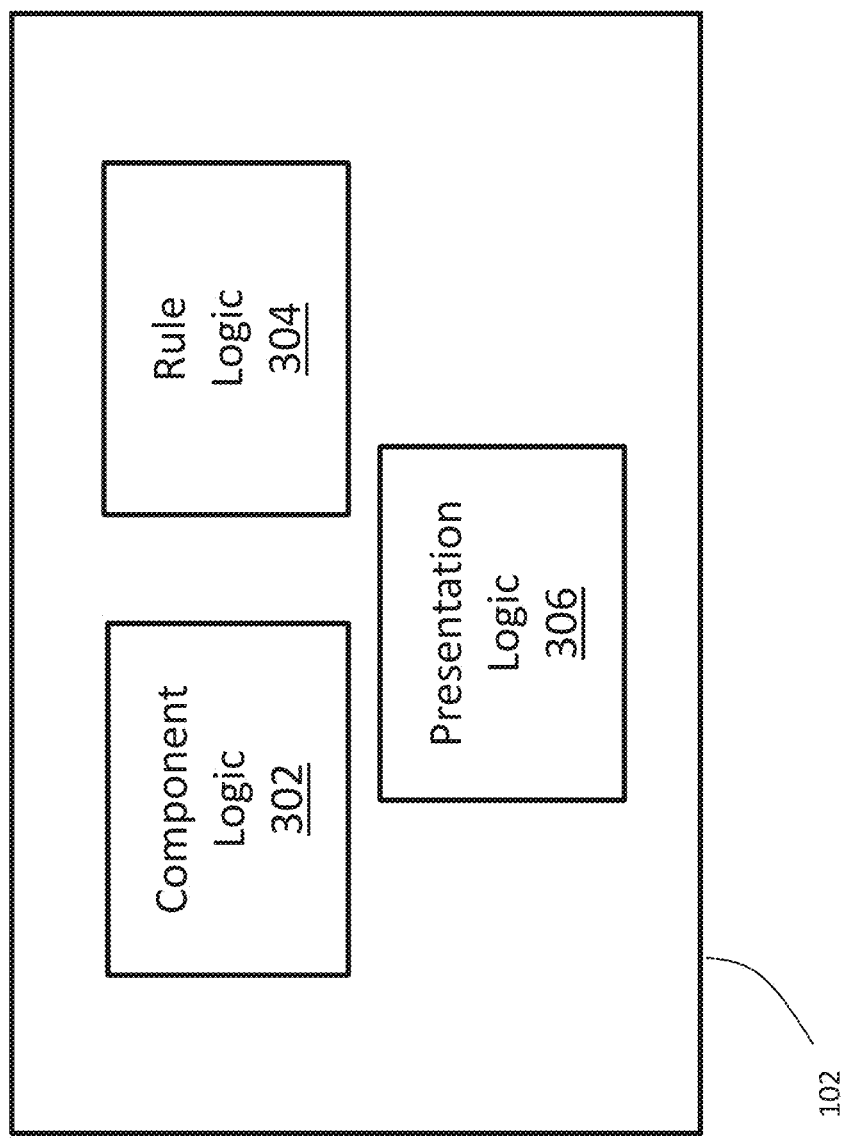
FIG. 3 illustrates a block diagram of an example computer of FIG. 1 for managing content of a presentation.

FIG. 3 illustrates a block diagram of an example content management server 102 of FIG. 1 and FIG. 2. Content management server 102 includes component logic 302 configured to communicate a set of presentation components to computer 104. Computer 104 is in turn configured to enable user 108 to select one or more components from the set of components to include in a presentation. In one example, component logic 302 is configured to communicate metadata associated with the components, rather than the complete components. For example, component logic 302 may communicate thumbnails, video clips, time codes duration, ratings, playlist names, security rights, workflow information, validation rules, or other suitable metadata associated with the components.

In one example, component logic 302 may be configured to receive login credentials of user 108. In such an example, component logic 302 may be configured to communicate a subset of components, based on the login credentials. For example, a systems administrator may choose to enable a first user to select from a first set of components and to enable a second user to select from a second set of components. Accordingly, component logic 302 may be configured to communicate the first set of components to computer 104 when the first user logs in and to communicate the second set of components to computer 104 when the second user logs in.

Component logic 302 is further configured to receive a selection of presentation components, selected from the set of communicated presentation components. In one example, component logic is configured to receive metadata associated with the selected components.

Content management server 102 further includes rule logic 304 configured to retrieve predefined rules associated with the selected presentation components. In one example, a systems administrator may predefine and store rules locally at content management server 102. Accordingly, rule logic 304 may be configured to retrieve rules from a database (not shown) hosted by content management server 102. In another example, rule logic 304 may be configured to retrieve rules from a third party service provider hosting such rules.

Rule logic 304 is further configured to apply the rules associated with the presentation components. In one example, rule logic 304 is configured to request a response to a question and to verify that the received response corresponds to an expected response. For example, certain industry regulations may require that specific presentation components only be presented to individuals who meet specific minimum professional qualifications. Accordingly, rule logic 304 may be configured to request confirmation that a certain component has been selected with the intention of presenting the component only to such a person meeting the minimum qualifications and to prevent the inclusion of the component in the presentation if confirmation is not received.

Content management server 102 includes presentation logic 306 configured to insert presentation components in a presentation according to determinations made by rule logic 304. In other words, rule logic 304 is configured to communicate with presentation logic 306 and to inform presentation logic 306 of what presentation components may be added to a presentation.

In another example, rule logic 304 is configured to determine that a rule requires a second presentation component to be inserted in the presentation. In such an example, presentation logic 306 is configured to automatically insert the second presentation component in the presentation. For example, a pharmaceutical industry regulation may require that a healthcare professional be presented with Important Safety Information relating to a drug before being presented with promotional material relating to the drug. Accordingly, presentation logic 306 may be configured to automatically include, in the presentation, a presentation component associated with Important Safety Information about a drug upon rule logic 304 determining that a selected presentation component relates to promotional material about the drug. The presentation logic 306 may be configured to automatically insert the second presentation component in the presentation in such a way as to insure that the second presentation component is presented prior to the selected presentation component being presented in order to ensure compliance with the rule.

In another example, presentation logic 304 may not be configured to automatically insert the second presentation component in the presentation upon rule logic 304 determining that a rule requires the second presentation component. Rather, rule logic 304 may be configured to request confirmation to proceed with adding the second presentation component to the presentation. Presentation logic 306, in turn, may be configured to insert the second presentation component in the presentation only upon rule logic 304 receiving confirmation. In such an example, rule logic 304 may be configured to prevent presentation logic 306 from adding the selected presentation component to the presentation unless confirmation is received.

Presentation logic 306 may be further configured to receive a request to transfer the presentation and to transfer the presentation, including both the selected presentation components and the presentation components determined to be required by associated rules, to computer 104.

Figure 4:
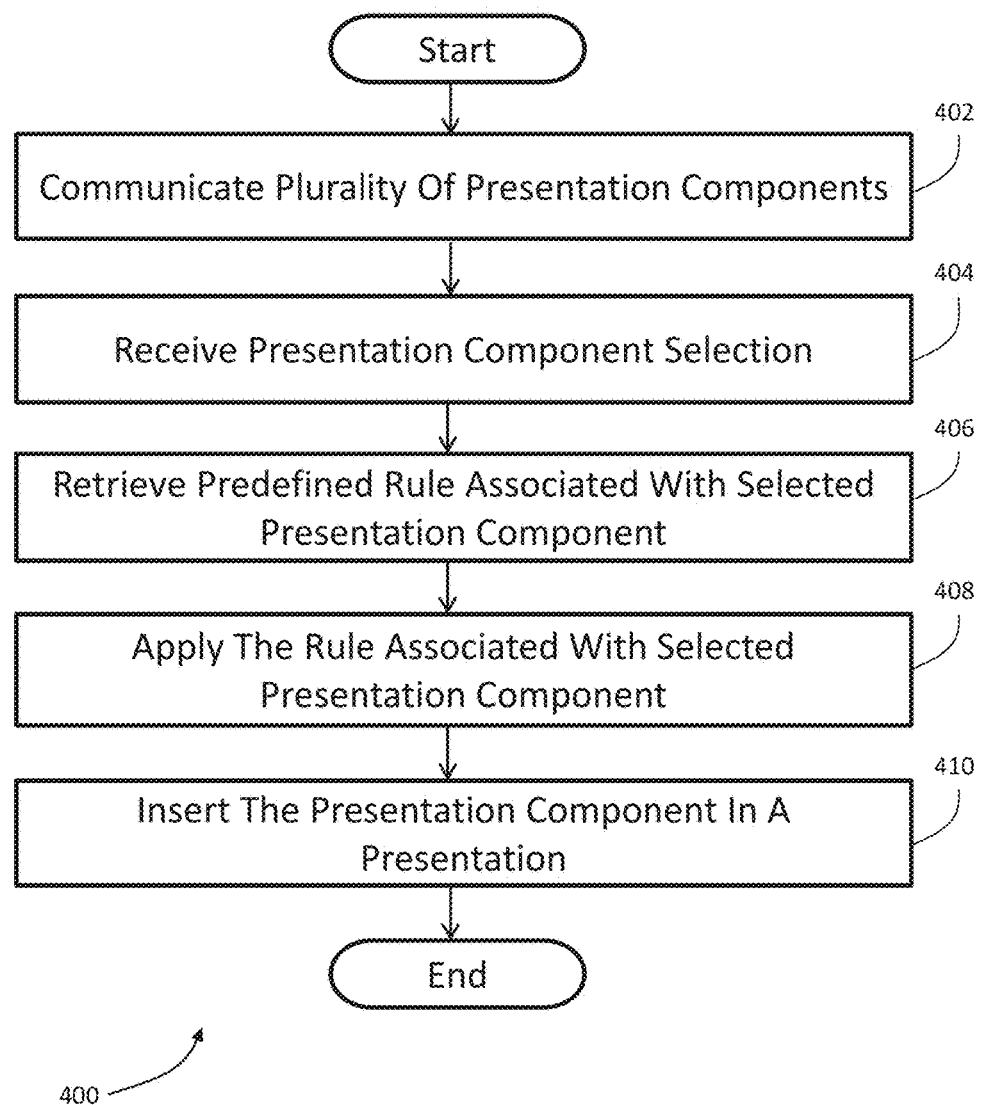
FIG. 4 is a flow chart illustrating an example rules based method for managing content of a presentation.

FIG. 4 is a flow chart illustrating an example method for managing content of a presentation. At step 402, content management server 102 communicates a set of presentation components to computer 104. At step 404, upon user 108 selecting one or more presentation components via computer 104, content management server 102 receives a presentation component selected from the set of communicated presentation components. At step 406, content management server 102 retrieves a predefined rule associated with the selected presentation component. At step 408, content management server 102 applies the retrieved rule associated with the selected presentation component. At step 410, content management server 102 inserts the selected presentation component into a presentation.

Figure 5:
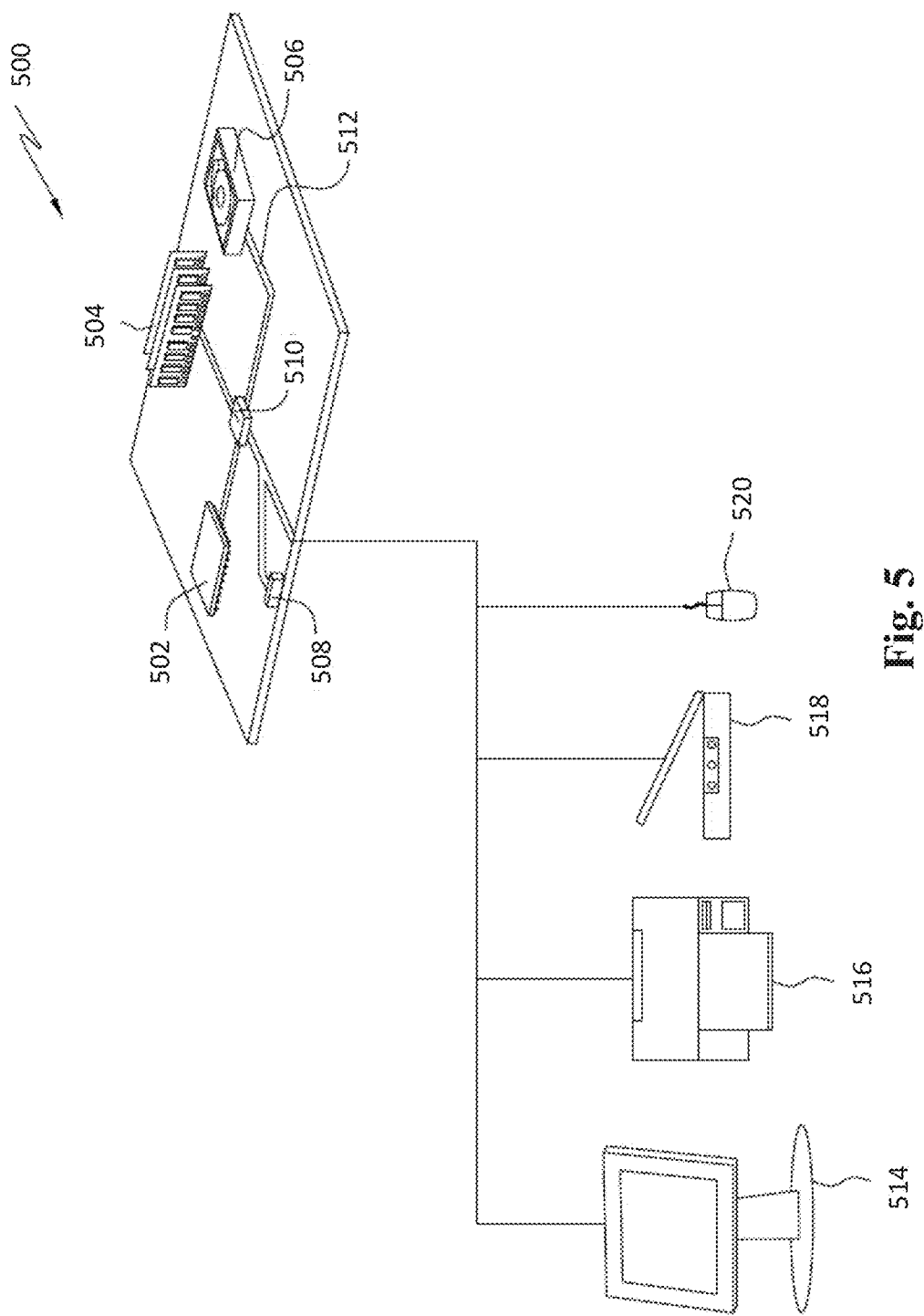
FIG. 5 is a schematic diagram of an example computer of FIG. 1 for managing content of a presentation.

FIG. 5 is a block diagram of an example computer 500 for implementing the content management server 102 of FIG. 1 and FIG. 2. The example computer 500 is intended to represent various forms of digital computers, including laptops, desktops, handheld computers, tablet computers, servers, and other similar types of computing devices. Computer 500 includes a processor 502, memory 504, a storage device 506, and a communication port 508, operably connected by an interface 510 via a bus 512.

Storage device 506 can store component logic 302, rule logic 304, and presentation logic 306.

Processor 502 processes instructions, via memory 504, for execution within computer 500. In an example embodiment, multiple processors along with multiple memories may be used.

Memory 504 may be volatile memory or non-volatile memory. Memory 504 may be a computer-readable medium, such as a magnetic disk or optical disk. Storage device 506 may be a computer-readable medium, such as floppy disk devices, a hard disk device, optical disk device, a tape device, a flash memory, phase change memory, or other similar solid state memory device, or an array of devices, including devices in a storage area network of other configurations. A computer program product can be tangibly embodied in a computer readable medium such as memory 504 or storage device 406. The computer program product may contain component logic 302, rule logic 304, and presentation logic 306.

Computer 500 can be coupled to one or more input and output devices such as a display 514, a printer 516, a scanner 518, and a mouse 520.

While example systems, methods, and so on, have been illustrated by describing examples, and while the examples have been described in considerable detail, it is not the intention to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, and illustrative examples shown or described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

Some portions of the detailed descriptions are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

The invention claimed is:

1. A computer-based method comprising:
receiving a first presentation component selected from a plurality of presentation components based on a user input;
retrieving a first rule associated with the first presentation component, wherein the first rule defines a minimum qualification for an individual to view a presentation of the first presentation component;
receiving a request to consider if a person meets the minimum qualification for viewing the first presentation component based on the user input about information of the person; and
verifying a response based on the user input regarding a qualification of the person, wherein verifying the response comprises one of:
inserting the first presentation component in the presentation based on the response indicating that the person meets the minimum qualification for the first presentation component; and
preventing inclusion of the first presentation component in the presentation based on the response indicating that the person does not meet the minimum qualification for the first presentation component;
receiving a second presentation component selected based on the plurality of presentation components based on the user input;
evaluating content of the second presentation component relative to a second rule, wherein the second rule defines a presentation sequence for the second presentation component in the presentation based on the content of the second presentation component; and
inserting a third presentation component selected from the plurality of presentation components in the presentation prior to inserting the second presentation component in the presentation based on a result of an evaluation of the content of the second presentation component relative to the second rule.

2. The computer-based method of claim 1, wherein a third rule defines an insertion of a fourth presentation component in the presentation, and wherein the method further comprises inserting the fourth presentation component in the presentation according to the third rule.

3. The computer-based method of claim 1, further comprising:
receiving a request from a computer associated with a user to transfer the presentation; and
transferring the presentation to the computer in response to the request, wherein the presentation comprises the first, the second, and the third presentation components.

4. The computer-based method of claim 1, wherein data representative of the plurality of presentation components comprises metadata associated with the plurality of presentation components.

5. The computer-based method of claim 1, further comprising
receiving access credentials associated with a user; and
transmitting data representative of a subset of presentation components of the plurality of presentation components to a computer based on the access credentials.

6. The computer-based method of claim 1, wherein the presentation corresponds to a slideshow.

7. A system comprising:
a non-transitory memory to store machine readable instructions and data; and
a processor to access the non-transitory memory and execute the machine readable instructions, the machine readable instructions causing the processor to:
transmit data representative of a plurality of presentation components;
receive selection data representative of a first presentation component selected from the plurality of presentation components based on a user input;
retrieve a first rule associated with the first presentation component based on the selection data, wherein the first rule defines a minimum qualification for an individual to view a presentation of the first presentation component;
receive a request to consider if a person meets the minimum qualification for viewing the first presentation component based on the user input about information of the person; and
verify a response based on the user input regarding a qualification of the person, wherein to verify the response comprise one of:
inserting the first presentation component in the presentation based on the response indicating that the person meets the minimum qualification for the first presentation component; and
preventing inclusion of the first presentation component in the presentation based on the response indicating that the person does not meet the minimum qualification for the first presentation component;
receive additional selection data representative of a second presentation component selected based on the plurality of presentation components based on the user input;
evaluate content of the second presentation component relative to a second rule in response to receiving the additional selection data, wherein the second rule defines a presentation sequence for the second presentation component in the presentation based on the content of the second presentation component; and
insert a third presentation component selected from the plurality of presentation components in the presentation prior to inserting the second presentation component in the presentation based on a result of an evaluation of the content of the second presentation component relative to the second rule.

8. The system of claim 7, wherein a third rule defines an insertion of a fourth presentation component in the presentation, and wherein the machine readable instructions further cause the processor to insert the fourth presentation component in the presentation according to the third rule.

9. The system of claim 7, wherein the machine readable instructions further cause the processor to:
receive a request from a computer associated with a user to transfer the presentation; and
transfer the presentation to the computer in response to the request, wherein the presentation comprises the first, the second and the third presentation components.

10. The system of claim 7, wherein the data representative of the plurality of presentation components comprises metadata associated with the plurality of presentation components.

11. The system of claim 7, wherein the machine readable instructions further cause the processor to:
receive access credentials associated with a user; and
communicate data representative of a subset of presentation components of the plurality of presentation components based on the received access credentials.

12. The system of claim 7, wherein the presentation corresponds to a slideshow.

13. A non-transitory computer-readable medium having instructions executable by a processor, the instructions programmed to perform a method, the method comprising:
transmitting data representative of a plurality of presentation components;
receiving selection data representative of a first presentation component selected from the plurality of presentation components based on a user input;
retrieving a first rule associated with the first presentation component based on the selection data, wherein the first rule defines a minimum qualification for an individual to view a presentation of the first presentation component;
receiving a request to consider if a person meets the minimum qualification for viewing the first presentation component based on the user input about information of the person; and
verifying a response based on the user input regarding a qualification of the person, wherein verifying the response comprises one of:
inserting the first presentation component in the presentation based on the response data indicating that the person meets the minimum qualification for the first presentation component; and
preventing inclusion of the first presentation component in the presentation based on the response data indicating that the person does not meet the minimum qualification for the first presentation component;
receiving additional selection data representative of a second presentation component selected based on the plurality of presentation components based on the user input;
evaluating content of the second presentation component relative to a second rule, wherein the second rule defines a presentation sequence for the second presentation component based on the content of the second presentation component; and
inserting a third presentation component selected from the plurality of presentation components in the presentation prior to inserting the second presentation component in the presentation based on a result of an evaluation of the content of the second presentation component relative to the second rule.

14. The non-transitory computer-readable medium of claim 13, further comprising:
   determining whether a fourth presentation component is to be inserted in the presentation according to third rule;
   inserting the fourth presentation component in the presentation based on a result of the determination.

15. The non-transitory computer-readable medium of claim 13, further comprising:
   receiving a request from a computer associated with a user to transfer the presentation; and
   transferring the presentation to the computer in response to the request, wherein the presentation comprises the first, the second, and the third presentation components.

16. The non-transitory computer-readable medium of claim 13, wherein the data representative of the plurality of presentation components comprises metadata associated with the plurality of presentation components.

17. The non-transitory computer-readable medium of claim 13, further comprising:
   receiving access credentials associated with a user; and
   transmitting data representative of a subset of presentation components of the plurality of presentation components to a computer based on the received access credentials.

18. The non-transitory computer-readable medium of claim 13, wherein the presentation corresponds to a slideshow.

\* \* \* \* \*